United States Patent [19]

Anno

[11] Patent Number: 4,656,983
[45] Date of Patent: Apr. 14, 1987

[54] CRANKSHAFT SUPPORTING AND LUBRICATING STRUCTURE FOR MULTICYLINDER INTERNAL COMBUSTION ENGINES

[75] Inventor: Nobuo Anno, Saitama, Japan

[73] Assignee: Honda Giken Kogyo Kabushiki Kaisha, Tokyo, Japan

[21] Appl. No.: 802,524

[22] Filed: Nov. 27, 1985

[30] Foreign Application Priority Data

Jun. 3, 1985 [JP] Japan .............................. 60-83812[U]

[51] Int. Cl.$^4$ ............................................. F01M 1/00
[52] U.S. Cl. ............................ 123/196 R; 123/195 H
[58] Field of Search ........ 123/196 R, 195 H, 198 MA

[56] References Cited

U.S. PATENT DOCUMENTS 3,046,954 7/1962 Hoffman et al. ................ 123/195 R
4,033,312 7/1977 Howe .............................. 123/196 R

FOREIGN PATENT DOCUMENTS 1328196 6/1973 United Kingdom ........... 123/195 H

*Primary Examiner*—E. Rollins Cross
*Attorney, Agent, or Firm*—Lyon & Lyon

[57] ABSTRACT

The crankshaft of an engine is supported by bearing caps mounted on journal walls of a cylinder block and a bridge interconnects the bearing caps. Oil passages in each bearing cap lead from the bridge to each crankshaft journal bearing at a laterally offset location rather than on the cylinder axis. A longitudinal main gallery in the bridge supplies oil to the passages and is laterally offset even further to that side. A supply passage in the bridge and one bearing cap at one extreme lateral side supplies oil from a pressurized oil supply passage in the cylinder block to that supply passage in the bearing cap.

14 Claims, 8 Drawing Figures

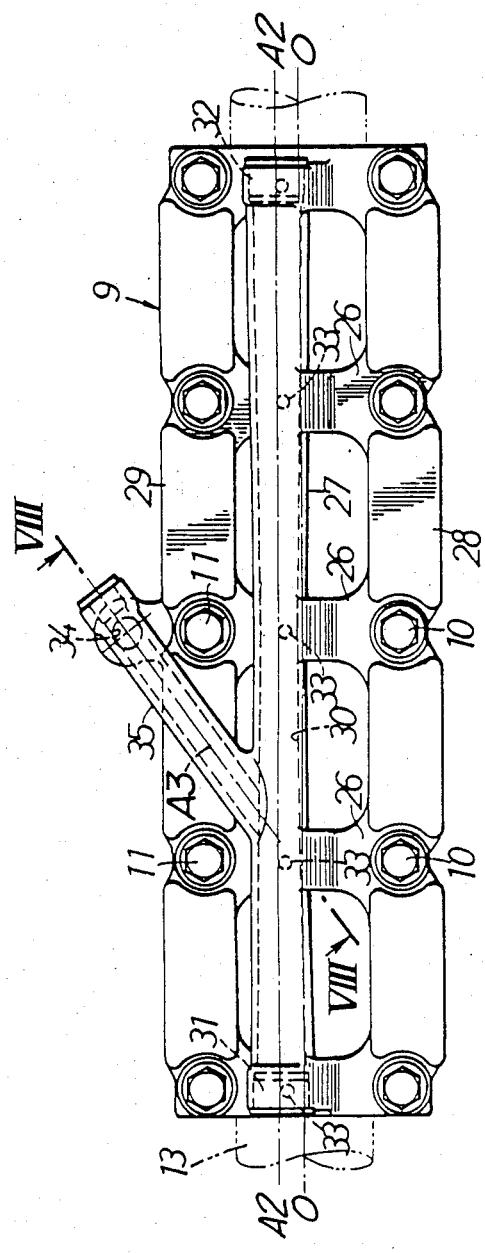

CRANKSHAFT SUPPORTING AND LUBRICATING STRUCTURE FOR MULTICYLINDER INTERNAL COMBUSTION ENGINES

The present invention relates to a crankshaft supporting structure for an in-line or V-shaped multicylinder internal combustion engine and, in particular, to a structural bridge and bearing cap arrangement for providing efficient oil lubrication for the crankshaft as well as increasing the rigidity of the assembled engine.

In the most common conventional construction of an internal combustion engine the crankshaft is removably supported on the cylinder block by a plurality of main bearings with a like plurality of bearing caps securing the main bearings and crankshaft to the cylinder block. In such cylinder an arrangement the lubricating oil is provided through passages in the cylinder block to the crankshaft and structural rigidity of the engine is supplied almost entirely by the cylinder block with the bearing caps adding slightly to the lateral rigidity only. Various structures have been proposed, such as shown in U.S. Pat. Nos. 3,046,954 and 3,841,203 increasing the structural rigidity of an engine by interconnecting some or all of the bearing caps with bridge elements or the like. U.S. Pat. No. 3,841,203 also suggests the use of an oil passage in the bridge as does U.S. Pat. No. 1,749,147 but each of the prior proposals have had various deficiencies or disadvantages.

Automotive internal combustion engines are required in recent years to produce a high power output while assuring improved fuel economy and engine reliability. Conventional engine designs however have been disadvantageous in that attempts to increase the power output fail to improve the fuel economy, and better fuel economy does not lead to a larger power output. Morever, lubrication oil distribution has often been complicated and costly in design and manufacture.

Therefore, it is an object of the present invention to provide a crankshaft supporting structure for multicylinder internal combustion engines which provides a convenient and efficient lubricating oil distribution system in a structural arrangement that increases the rigidity of the crankshaft bearing assembly.

Another object of this invention is to provide such a structure wherein the lubricating oil is supplied under pressure directly from an oil supply through the structural bridge member to the crankshaft bearings with a minimal time delay for assuring positive lubrication at all times.

A preferred embodiment of the present invention is incorporated in an in-line four cylinder internal combustion engine which will be described with reference to the drawings, wherein:

FIG. 5 is a bottom view of the structural bridge member taken in the direction of arrow V in FIG. 2.

Figure 1:
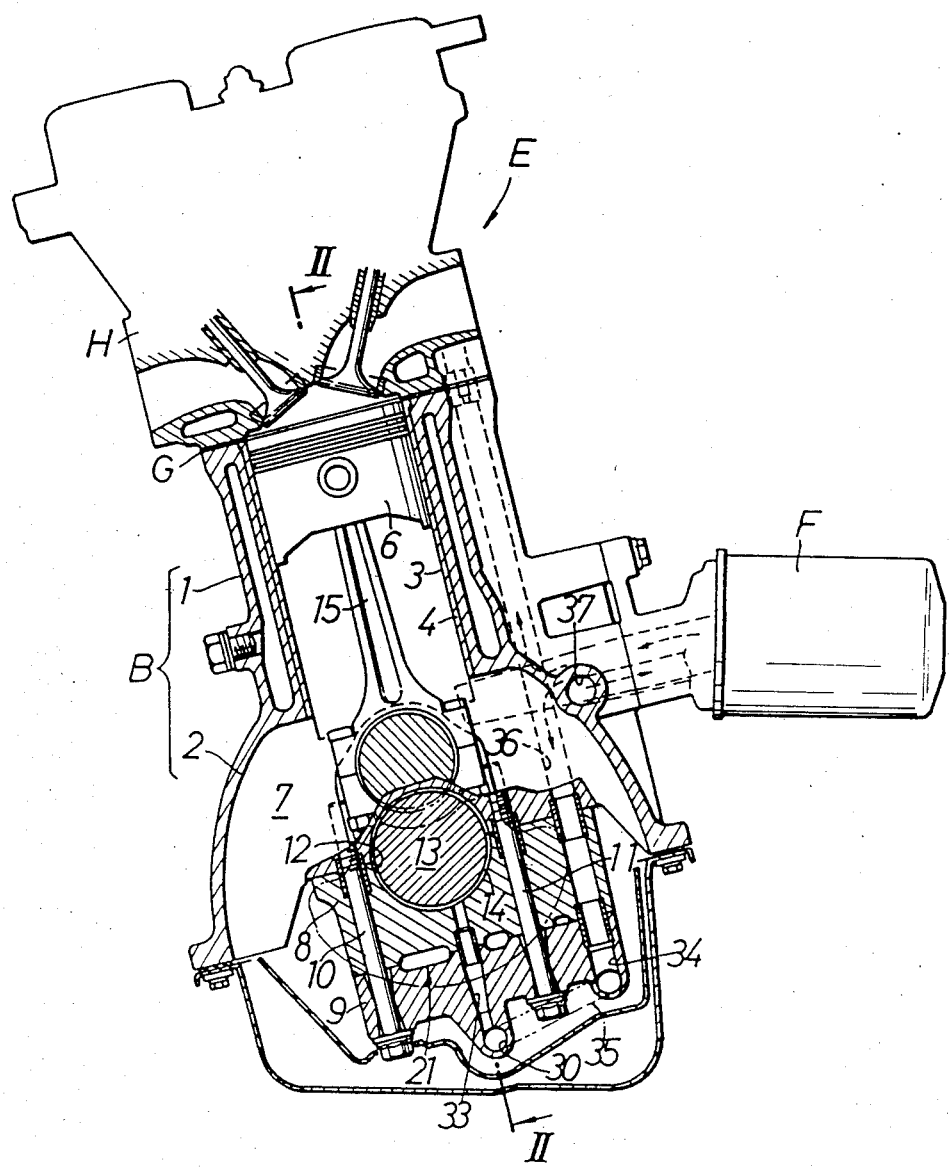
FIG. 1 is a sectional end view of a preferred embodiment of the crankshaft support structure and lubricating system of this invention in a cylinder block of an internal combustion engine.
Figure 2:
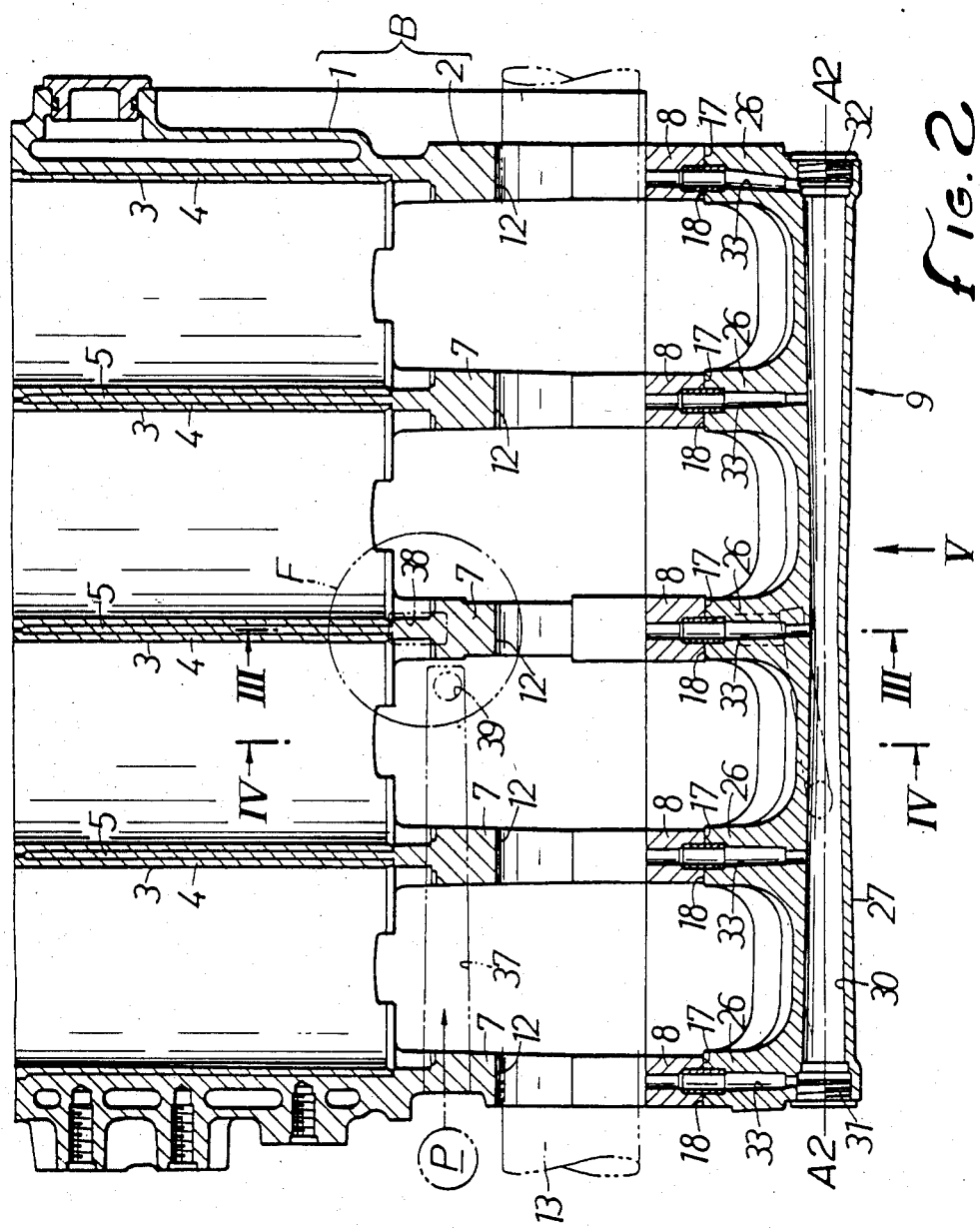
FIG. 2 is a sectional side view of the structure of FIG. 1 taken substantially on the line II—II of FIG. 1.

As shown in FIGS. 1 and 2, an in-line four-cylinder water-cooled internal combustion engine has an engine body E composed of a cylinder block B and a cylinder head H connected to the upper surface of the cylinder block B through a gasket G.

The cylinder block B preferably is integrally cast of an aluminum alloy by a pressure casting process and comprises an upper cylinder housing 1 and a lower crankcase 2. The cylinder housing 1 has a plurality of in-line cylinder bores 3 defined therein in the so-called "Siamese" configuration with no water jackets defined in the cylinder walls 5 between the cylinder bores 3. A cylinder liner 4 is cast in each of the cylinder bores 3. A piston 6 is slidably fitted in the cylinder liner 4.

The crankcase 2 has a plurality of integral journal walls 7 arranged at spaced intervals along the row of the cylinder bores 3. Bearing caps 8, preferably of iron, are held against the lower surfaces of the journal walls 7, respectively, and a bridge 9 of an aluminum alloy extends across and is held against the lower surfaces of the bearing caps 8. The bridge 9 and the bearing caps 8 are secured to the journal walls 7 in any convenient manner such as by a pair of connecting bolts 10 and 11 extending through each of the bearing caps 8. The journal walls 7 and the bearing caps 8 define bearing holes 12 between the connecting bolts 10 and 11. A crankshaft 13 is rotatably supported in the bearing holes 12 by sleeve bearings 14. The crankshaft 13 is operatively connected to the pistons 6 by connecting rods 15 in the usual manner.

Figure 7:
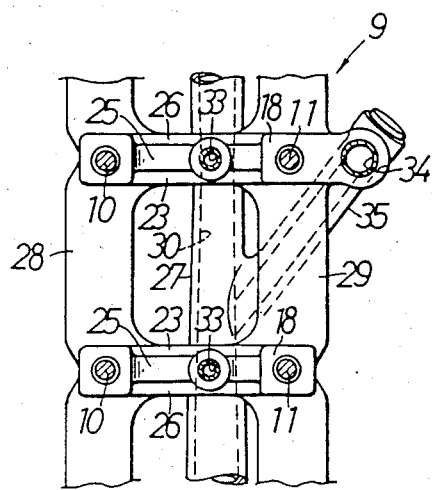
FIG. 7 is a fragmentary top view of the bridge, with portions in section, taken substantially on the line VII—VII in FIG. 3.
Figure 4:
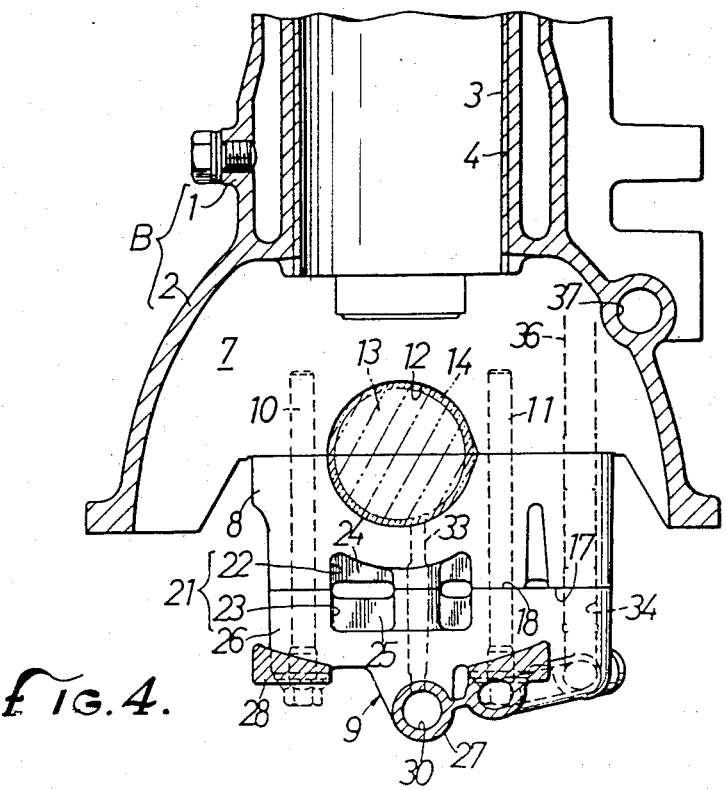
FIG. 4 is a fragmentary sectional end view similar to FIG. 3 taken substantially on the line IV—IV in FIG. 2.
Figure 6:
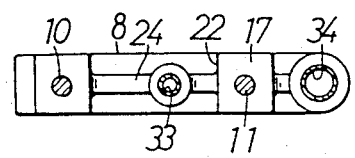
FIG. 6 is a bottom view of a bearing cap, with portions in section, taken substantially on the line VI—VI in FIG. 3.

As shown in detail in FIGS. 4, 6 and 7, cavities 21 are defined at the joined surfaces of the bearing caps 8 and the bridge 9 between the connecting bolts 10 and 11 in surrounding relation to branch oil passages 33 (hereafter described in detail). Each of the cavities 21 is composed of a downwardly opening upper recess 22 (FIG. 6) defined in the lower joined surface 17 of the bearing cap 8 and an upwardly opening lower recess 23 defined in the upper joined surface 18 of an upper wall 26 of the bridge 9 in registry with the upper recess 22. The upper and lower recesses 22 and 23 are reinforced by reinforcing ribs 24 and 25, respectively. The cavities 21 are therefore effective in reducing the weight of the bearing caps 8 and the bridge 9 without impairing the rigidity thereof.

As illustrated in FIG. 5, the bridge 9 by which the iron bearing caps 8 are interconnected is of a grid shape having a plurality of support walls 26 joined to the bearing caps 8, respectively, and interconnected by a central frame 27 and outer longitudinal frames 28 and 29 extending parallel to each other and the crankshaft 13. The central longitudinal frame 27 has a main gallery 30 for supplying lubricating oil to the bearings 14 around the crankshaft 13. The main gallery 30 has its opposite ends closed off by blind plugs 31 and 32. The main gallery 30 is held in com munication with the lower ends of branch oil passages 33 defined through the bearing caps 8 and the support walls 26 of the bridge 9. The branch oil passages 33 have their upper ends communicating with the bearing hole 12.

Figure 3:
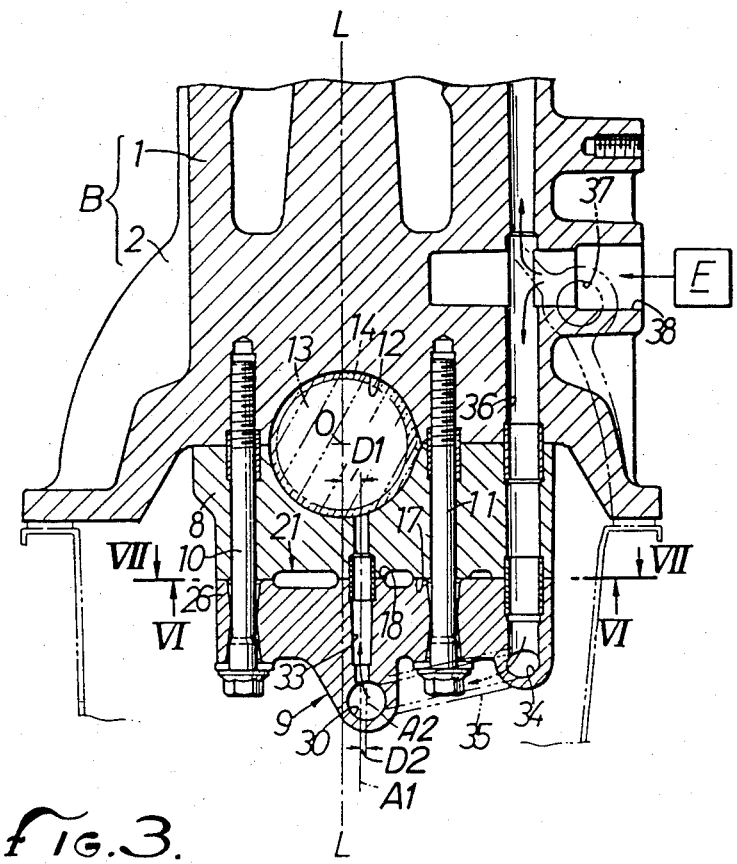
FIG. 3 is a fragmentary sectional end view similar to FIG. 1 taken substantially on the line III—III in FIG. 2.

As shown in FIG. 3, each branch oil passage 33 has a central axis A1 which is deviated a distance E1 in one direction (to the right in FIG. 3) from the cylinder axis L passing through the center O of the crankshaft 13. The main gallery 30 has a central axis A2 deviated a distance E2 in the same direction from the central axis A1 of the branch oil passage 33 whereby the main gallery axis A2 is deviated from the cylinder axis a total distance equal to E1 plus E2.

Figure 8:
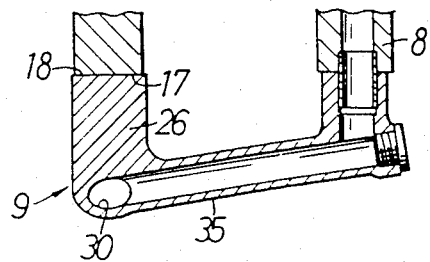
FIG. 8 is a fragmentary sectional elevation view taken substantially on the line VIII—VIII in FIG. 5.

As illustrated in FIGS. 3, 7 and 8, an oil supply passage 34 is defined through one of the bearing caps 8 and the bride 9 on the same side thereof to which the main gallery 30 is deviated. The oil supply passage 34 has a lower end communicating with an intermediate portion of the main gallery 30 through a connecting oil tube 35 integral with the bridge 9. As shown in FIGS. 3 and 5, the connecting oil tube 35 also is positioned on the same side to which the branch oil passage 33 and the main gallery 30 are deviated and is transversely inclined with respect to the main gallery 30. The oil tube 35 has an inner end communicating with the main gallery 30 between two adjacent branch oil passages 33. The oil tube 35 has a central axis A3 which does not cross the central axes A1 of the branch oil passage 33. Therefore, the dynamic pressure of lubricating oil flowing under pressure from the oil passage 34 through the connecting oil tube 35 into the main gallery 30 does not act directly in any single branch oil passage 33.

As shown in FIGS. 2 and 3, the oil passage 34 has an upper end communicating with an oil passage 36 defined in the cylinder block B. The oil passage 36 is held in communication with the outlet 38 of an oil filter F which has its inlet 39 communicating with an oil pump P through an oil supply passage 37 defined in the cylinder block B.

Operation of the foregoing embodiment is as follows. When the engine is in operation, the explosion pressure acting on the pistons 6 is imposed on the crankshaft 13. The crankshaft 13 is rigidly supported by the bearing caps 8 and the bridge 9 interconnecting the bearing caps 8. The cavities 21 defined in the joined surfaces 17 and 18 of the bearing caps 8 and the bridge 9 serve to reduce the weight of the bearing caps 8 and the bridge 9 without impairing their rigidity, and are also effective to absorb the tendancy for displacement arising from different thermal expansions of the bearings caps 8 of iron and the bridge 9 of an aluminum alloy. The cavities 21 are also served to radiate heat from the bearing caps 8 and the bridge 9 to suppress any thermal deformation of the portion supporting the crankshaft 13 and to reduce stresses applied to the crankshaft 13. Lubricating oil fed under pressure from the oil pump P driven by the engine flows through the oil supply passage 37 into the oil filter F. After the lubricating oil has been filtered by the filter F, it flows through the oil passage 36, the oil passage 34, and the connecting oil tube 35 into the main gallery 30, from which the lubricating oil passes through the branch oil passages 33 to the bearings 14 around the crankshaft 13. Since the central axis A3 of the connecting oil tube 35 does not cross the central axis A1 of any of the branch oil passages 33, the dynamic pressure of the lubricating oil flowing from the connecting oil tube 35 into the main gallery 30 does not act directly on any of the branch oil passages 33. Therefore, the lubricating oil is supplied under substantially uniform pressure into each of the branch oil passages 33. Since the branch oil passages 33 and the main gallery 30 are positioned to one side of the cylinder axes L passing through the center O of the crankshaft 13, the connecting oil tube 35 has a small length for causing the lubricating oil to be supplied from the oil pump P to the branch oil passages 33 without a large time delay. Therefore, the crankshaft 13 can be lubricated efficiently. Further, the branch oil passages 33 which are deviated from the cylinder axis L are not located on the cylinder axes L in the position in which the crankshaft 13 would be subject to the largest explosion pressure and therefore any reduction in the rigidity of the bearing caps 8 arising from the formation of the branch oil passages 33 therein is held to a minimum.

According to the present invention, as is clear from the above description, a plurality of branch oil passages are defined in bearing caps and a bridge for supplying lubricating oil to the bearings of a crankshaft, the branch oil passages being deviated to one side from a cylinder axis extending through the center of the crankshaft. The bridge has a main gallery defined therein in communication with the branch oil passages and is deviated even further on the same side as that to which the branch oil passages are deviated. The main gallery is held in communication with an oil source through an oil passage defined in one of the bearing caps and the bridge and positioned on the same side as the side to which the branch oil passages 33 are deviated. Therefore, the distance between the oil passages leading to the oil source and the main gallery is shortened for allowing lubricating oil to be supplied from the oil source to the crankshaft bearings without a large time delay after the engine has been operated. The crankshaft can thus be lubricated efficiently for improved engine performance.

The branch oil passage for supplying the lubricating oil to the crankshaft bearings are deviated from the cylinder axis passing through the center of the crankshaft, and hence from the position in which the branch oil passages would be subject to the maximum load arising from the explosion in the engine cylinders. As a consequence, the effect of any reduction in the rigidity of the bearing caps and the bridge due to the formation of the branch oil passages is minimized.

The invention claimed is:

1. A crankshaft supporting and lubricating device in a multicylinder internal combustion engine having a plurality of bearing caps secured to a plurality of journal walls of a cylinder block rotatably supporting a crankshaft between the bearing caps and the journal walls with a bridge interconnecting the bearing caps, the improvement comprising, said bearing caps and said bridge having a plurality of branch oil passages defined therein for supplying lubricating oil to bearings of the crankshaft, said branch oil passages being deviated to one side from a cylinder axis passing through the center of said crankshaft, said bridge having a main gallery defined therein in communication with said branch oil passages and also deviated to said one side, said bridge and one of said bearing caps having an oil passage defined therein on said one side and providing communication between said main gallery and a pressurized oil source.

2. A crankshaft supporting and lubricating device in a multicylinder internal combustion engine having a cylinder block with a plurality of journal walls and a passage from a pressurized oil source, a bearing cap secured to each journal wall for rotatably supporting a crankshaft, and a bridge interconnecting the bearing caps, the improvement, comprising, a plurality of branch oil passages in the bearing caps and bridge for supplying lubricating oil to bearings of the crankshaft, said branch oil passages being located to one side of a cylinder axis passing through the center of said crankshaft, said bridge having a main gallery defined therein in communication with said branch oil passages and also located to said one side, and a supply oil passage in said bridge and one of said bearing caps on said one side and providing communication between said main gallery and the oil source.

3. The device of claim 2 wherein said supply oil passage extends at an angle to and intersects the main gallery between two bearing caps.

4. The device of claim 3 wherein the supply oil passage is substantially straight and has a first axis, the main gallery is substantially straight and has a second axis, and said first and second axes intersect at an angle of approximately 45°.

5. The device of claim 4 wherein the said first axis is at a small angle to a plane perpendicular to the cylinder axis.

6. The device of claim 2 wherein said main gallery is located further to said one side than said branch oil passages.

7. The device of claim 2 wherein said bearing caps and journal walls have flat interengaging surfaces perpendicular to the cylinder axis, and said branch oil passages are perpendicular to said interengaging surfaces.

8. The device of claim 7 wherein said supply oil passage includes a portion in the bridge and the entire portion in the bearing cap extending perpendicular to said interengaging surfaces.

9. The device of claim 8 wherein said supply oil passage includes another portion in the bridge extending at an acute angle to and intersecting said main gallery.

10. The device of claim 7 wherein said bearing caps have recessed portions at and near said interengaging surfaces for reducing the weight of the bearing caps.

11. The device of claim 10 wherein said bridge has recessed portions at and near said interengaging surfaces for reducing the weight of the bridge.

12. The device of claim 11 wherein a portion of said recessed portions create spaces between the bridge and bearing caps.

13. The device of claim 2 wherein said branch oil passages each have an axis, said main gallery has an axis, and said axes of said branch oil passages intersect said main gallery offset from said main gallery axis.

14. The device of claim 13 wherein said main gallery axis is located further from the cylinder axis than said branch oil passage axes.

* * * * *